US012296327B2

(12) United States Patent
Poss et al.

(10) Patent No.: US 12,296,327 B2
(45) Date of Patent: May 13, 2025

(54) METAL FOAM ELEMENT CONTAINING COBALT AND METHOD FOR PRODUCING SAME

(71) Applicant: EVONIK OPERATIONS GMBH, Essen (DE)

(72) Inventors: René Poss, Karlsruhe (DE); Meike Roos, Büdingen (DE); Monika Berweiler, Maintal (DE); Maximilian Glaser, Obertshausen (DE)

(73) Assignee: Evonik Operations GmbH, Essen (DE)

( * ) Notice: Subject to any disclaimer, the term of this patent is extended or adjusted under 35 U.S.C. 154(b) by 537 days.

(21) Appl. No.: 17/762,730

(22) PCT Filed: Sep. 25, 2020

(86) PCT No.: PCT/EP2020/076854
§ 371 (c)(1),
(2) Date: Mar. 23, 2022

(87) PCT Pub. No.: WO2021/058719
PCT Pub. Date: Apr. 1, 2021

(65) Prior Publication Data
US 2022/0362757 A1 Nov. 17, 2022

(30) Foreign Application Priority Data
Sep. 25, 2019 (EP) .................................. 19199651

(51) Int. Cl.
| | | |
|---|---|---|
| *B01J 21/04* | (2006.01) | |
| *B01J 21/06* | (2006.01) | |
| *B01J 21/08* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/48* | (2006.01) | |
| *B01J 23/54* | (2006.01) | |
| *B01J 23/63* | (2006.01) | |

(Continued)

(52) U.S. Cl.
CPC .......... *B01J 37/0226* (2013.01); *B01J 21/04* (2013.01); *B01J 23/75* (2013.01); *B01J 23/755* (2013.01); *B01J 35/56* (2024.01); *B01J 37/0205* (2013.01); *B01J 37/0209* (2013.01); *B01J 37/024* (2013.01); *B01J 37/08* (2013.01); *B01J 37/14* (2013.01); *B22F 3/114* (2013.01); *B22F 3/1143* (2013.01); *B22F 3/1146* (2013.01); *B22F 3/24* (2013.01); *B22F 7/04* (2013.01); *B22F 2003/242* (2013.01); *B22F 2007/045* (2013.01); *B22F 2301/052* (2013.01)

(58) Field of Classification Search
CPC .......... B01J 21/04; B01J 21/063; B01J 21/08; B01J 23/10; B01J 23/42; B01J 23/44; B01J 23/46; B01J 23/48; B01J 23/54; B01J 23/63; B01J 23/745; B01J 23/75; B01J 23/755; B01J 23/76; B01J 23/83; B01J 23/8906; B01J 23/7913; B01J 23/892; B01J 23/894; B01J 35/56; B01J 37/0205; B01J 37/0209; B01J 37/0226; B01J 37/024; B01J 37/08; B01J 37/14; B22F 3/114; B22F 3/1143; B22F 3/1146; B22F 3/24; B22F 7/04
USPC ........ 502/258–262, 304, 332–339, 349, 350, 502/355, 415, 439
See application file for complete search history.

(56) References Cited

U.S. PATENT DOCUMENTS

| 4,049,580 A | 9/1977 | Oden et al. |
| 4,491,564 A | 1/1985 | Gray |

(Continued)

FOREIGN PATENT DOCUMENTS

| CN | 1798717 | 7/2006 |
| CN | 101254466 | 9/2008 |

(Continued)

OTHER PUBLICATIONS

English language translation of the International Search Report for corresponding international application PCT/EP2020/076854, filed Sep. 25, 2020.
English language translation of the Written Opinion of the International Searching Authority for corresponding international application PCT/EP2020/076854, filed Sep. 25, 2020.
International Preliminary Report on Patentability for corresponding international application PCT/EP2020/076854, filed Sep. 25, 2020.

(Continued)

*Primary Examiner* — Cam N. Nguyen
(74) *Attorney, Agent, or Firm* — Law Office of: Michael A. Sanzo, LLC

(57) ABSTRACT

The present invention relates to a method for producing supported catalysts, comprising: providing a metal foam element A, which consists of metallic cobalt, an alloy of nickel and cobalt, or an arrangement of layers of nickel and cobalt, lying one over the other; applying an aluminum-containing powder MP to metal foam element A in order to obtain metal foam element AX; thermally treating metal foam element AX to achieve alloy formation between metal foam element A and aluminum-containing powder MP, in order to obtain metal foam element B; oxidatively treating metal foam element B, in order to obtain metal foam element C; and applying a catalytically active layer, comprising at least one support oxide and at least one catalytically active component, to at least part of the surface of metal foam element C, in order to obtain a supported catalyst. The present invention further relates to the supported catalysts that can be obtained using the method and to the use of said supported catalysts in chemical transformations.

16 Claims, No Drawings

(51) Int. Cl.
| | |
|---|---|
| *B01J 23/745* | (2006.01) |
| *B01J 23/75* | (2006.01) |
| *B01J 23/755* | (2006.01) |
| *B01J 23/76* | (2006.01) |
| *B01J 23/83* | (2006.01) |
| *B01J 23/89* | (2006.01) |
| *B01J 35/56* | (2024.01) |
| *B01J 37/02* | (2006.01) |
| *B01J 37/08* | (2006.01) |
| *B01J 37/14* | (2006.01) |
| *B22F 3/11* | (2006.01) |
| *B22F 3/24* | (2006.01) |
| *B22F 7/04* | (2006.01) |

(56) References Cited

U.S. PATENT DOCUMENTS

| | | | |
|---|---|---|---|
| 5,045,277 | A | 9/1991 | Penkunas et al. |
| 5,851,599 | A | 12/1998 | Harada et al. |
| 6,436,166 | B2 | 8/2002 | Arvidsson et al. |
| 6,530,514 | B2 | 3/2003 | Shabtay |
| 7,700,518 | B2 * | 4/2010 | Wang ............... B01J 12/007 422/177 |
| 8,758,675 | B2 | 6/2014 | Böhm et al. |
| 10,596,556 | B2 | 3/2020 | Radivojevic et al. |
| 10,675,682 | B2 | 6/2020 | Nakamura et al. |
| 10,814,390 | B2 | 10/2020 | Skszek et al. |
| 11,090,637 | B2 * | 8/2021 | Wieland ............... C07C 29/172 |
| 11,173,479 | B2 | 11/2021 | Schroeter et al. |
| 11,260,375 | B2 | 3/2022 | Berweiler et al. |
| 11,401,224 | B2 | 8/2022 | Roos et al. |
| 11,819,832 | B2 | 11/2023 | Roos et al. |
| 2005/0275143 | A1 | 12/2005 | Toth |
| 2008/0031767 | A1 | 2/2008 | Naumann et al. |
| 2008/0171218 | A1 | 7/2008 | Naumann et al. |
| 2011/0281723 | A1 | 11/2011 | Tsai et al. |
| 2012/0141670 | A1 | 6/2012 | Walther et al. |
| 2012/0329889 | A1 | 12/2012 | Yang et al. |
| 2014/0221700 | A1 | 8/2014 | Radivojevic et al. |
| 2017/0141074 | A1 | 5/2017 | Schäfer et al. |
| 2017/0167041 | A1 | 6/2017 | Poss et al. |
| 2018/0010257 | A1 | 1/2018 | Braun et al. |
| 2018/0230081 | A1 * | 8/2018 | Rüfer ............... B01J 35/615 |
| 2019/0210010 | A1 | 7/2019 | Pinkos et al. |
| 2019/0232257 | A1 | 8/2019 | Wieland et al. |
| 2019/0344248 | A1 | 11/2019 | Pinkos et al. |
| 2020/0016579 | A1 | 1/2020 | Schreiber et al. |
| 2021/0010146 | A1 | 1/2021 | Poss et al. |
| 2021/0032185 | A1 | 2/2021 | Roos et al. |
| 2021/0275996 | A1 | 9/2021 | Roos et al. |
| 2021/0276091 | A1 | 9/2021 | Poss et al. |
| 2022/0387986 | A1 | 12/2022 | Poss et al. |
| 2022/0395816 | A1 | 12/2022 | Poss et al. |
| 2023/0001388 | A1 | 1/2023 | Poss et al. |

FOREIGN PATENT DOCUMENTS

| | | |
|---|---|---|
| CN | 101391222 | 3/2009 |
| CN | 101537360 | 9/2009 |
| CN | 101537361 | 9/2009 |
| CN | 101549297 | 10/2009 |
| CN | 101921924 | 12/2010 |
| CN | 102121090 | 7/2011 |
| CN | 106801159 | 6/2017 |
| CN | 109175382 | 1/2019 |
| DE | 102009015176 | 7/2011 |
| EP | 2 764 916 | 8/2014 |
| JP | 2002241102 | 8/2002 |
| JP | 2005205265 | 8/2005 |
| JP | 2006-049595 | 2/2006 |
| KR | 101857435 | 5/2018 |
| WO | WO 95/11752 | 5/1995 |
| WO | WO 2015/028738 | 3/2015 |

OTHER PUBLICATIONS

European Search Report and Search Opinion for EP 19199651 filed Sep. 25, 2019, corresponding to PCT/EP2020/076854 and PCT/EP2020/076825; with partial English language machine translation of the Search Opinion.

English language translation of the International Search Report for international application PCT/EP2020/076825, filed Sep. 25, 2020, corresponding to copending U.S. Appl. No. 17/762,732.

English language translation of the Written Opinion of the International Searching Authority for international application PCT/EP2020/076825, filed Sep. 25, 2020, corresponding to copending U.S. Appl. No. 17/762,732.

International Preliminary Report on Patentability for international application PCT/EP2020/076825, filed Sep. 25, 2020, corresponding to copending U.S. Appl. No. 17/762,732.

English language translation of the International Search Report for PCT/EP2020/076824, filed Sep. 25, 2020, corresponding to copending U.S. Appl. No. 17/762,848.

English language translation of the Written Opinion of the International Searching Authority for international application PCT/EP2020/076824, filed Sep. 25, 2020, corresponding to copending U.S. Appl. No. 17/762,848.

English language translation of the International Preliminary Report on Patentability for international application PCT/EP2020/076824, filed Sep. 25, 2020, corresponding to copending U.S. Appl. No. 17/762,848.

European Search Report and Search Opinion for EP 19199659 filed Sep. 25, 2019, corresponding to international application PCT/EP2020/076824; with partial English language machine translation of the Search Opinion.

English language translation of the International Search Report for international application PCT/EP2020/076822, filed Sep. 25, 2020, corresponding to copending U.S. Appl. No. 17/762,986.

English language translation of the Written Opinion of the International Searching Authority for international application PCT/EP2020/076822, filed Sep. 25, 2020, corresponding to copending U.S. Appl. No. 17/762,986.

International Preliminary Report on Patentability for international application PCT/EP2020/076822, filed Sep. 25, 2020, corresponding to copending U.S. Appl. No. 17/762,986.

European Search Report and Search Opinion for EP 19199638 filed Sep. 25, 2019, corresponding to PCT/EP2020/076822; with partial English language machine translation of the Search Opinion.

English language translation of the International Search Report for international application PCT/EP2020/076826, filed Sep. 25, 2020, corresponding to copending U.S. Appl. No. 17/053,340.

English language translation of the Written Opinion of the International Searching Authority for international application PCT/EP2020/076826, filed Sep. 25, 2020, corresponding to copending U.S. Appl. No. 17/053,340.

International Preliminary Report on Patentability for international application PCT/EP2020/076826, filed Sep. 25, 2020, corresponding to copending U.S. Appl. No. 17/053,340.

European Search Report and Search Opinion for EP 19199643 filed Sep. 25, 2019, corresponding to PCT/EP2020/076826; with partial English language machine translation of the Search Opinion.

Chang, et al., "A thermally self-sustaining solid oxide fuel cell system at ultra-lo operating temperature (319 C)," *Energy* 104(20):107-113 (Apr. 2016).

Wen-Wen, et al., "Synthesis and Compression Property of Oxidation-Resistant Ni—Al Foams," *Acta. Metall. Sin.* 30(1):965-972 (Mar. 2017).

Yashnik, et al., "High-Performance Mn—Al—O Catalyst on Reticulated Foam Materials for Environmentally Friendly Catalytic Combustion," *Eurasian Chemico-Technological Journal* 17(2):145-158 (Jan. 2015).

Ullman's Encyclopedia of Industrial Chemistry, "Metallic Foams" chapter, published online on Jul. 15, 2012, DOI: 25 10.1002/14356007.c16_c01.pub2.

Restriction Requirement for copending U.S. Appl. No. 17/053,340, mailed Feb. 28, 2022.

(56) References Cited

OTHER PUBLICATIONS

Response to Restriction Requirement for copending U.S. Appl. No. 17/053,340, filed Apr. 19, 2022.
U.S. Appl. No. 16/969,607, filed Aug. 13, 2020, US-2021/0032185 A1, Feb. 4, 2021, Roos.
U.S. Appl. No. 17/053,340, filed Nov. 5, 2020, US-2021/0276091 A1, Sep. 9, 2021, Poss.
U.S. Appl. No. 17/059,488, filed Nov. 29, 2020, US-2021/0275996 A1, Sep. 9, 2021, Roos.
U.S. Appl. No. 17/762,732, filed Mar. 23, 2022, Poss.
U.S. Appl. No. 17/762,848, filed Mar. 23, 2022, Poss.
U.S. Appl. No. 17/762,986, filed Mar. 23, 2022, Poss.
Non Final Office Action for copending U.S. Appl. No. 17/053,340, mailed Jul. 13, 2022.
Non-Final Office Action for copending U.S. Appl. No. 17/053,340, mailed May 19, 2023.
U.S. Appl. No. 18/439,722, filed Feb. 12, 2024, Poss.
Amendment & Response to Office Action for copending U.S. Appl. No. 17/053,340, filed Oct. 12, 2022.
Final Office Action for copending U.S. Appl. No. 17/053,340, mailed Jan. 5, 2023.
Request for Continued Examination for copending U.S. Appl. No. 17/053,340, filed Apr. 3, 2023.
Amendment & Response to Accompany RCE for copending U.S. Appl. No. 17/053,340, filed Apr. 3, 2023.
Amendment & Response for copending U.S. Appl. No. 17/053,340, filed Aug. 8, 2023.
Final Office Action for copending U.S. Appl. No. 17/053,340, mailed Aug. 16, 2023.
Request for Continued Examination for copending U.S. Appl. No. 17/053,340, filed Nov. 3, 2023.
Amendment & Response th Accompany RCE for copending U.S. Appl. No. 17/053,340, filed Nov. 3, 2023.
International Search Report for international application PCT/EP2022/056426, filed Mar. 14, 2022, corresponding to copending U.S. Appl. No. 18/283,156.
Revised version of the International Search Report for international application PCT/EP2022/056426, filed Mar. 14, 2022, corresponding to copending U.S. Appl. No. 18/283,156.
Written Opinion of the International Searching Authority for international application PCT/EP2022/056426, filed Mar. 14, 2022, corresponding to copending U.S. Appl. No. 18/283,156.
Revised version of the Written Opinion of the International Searching Authority for international application PCT/EP2022/056426, filed Mar. 14, 2022, corresponding to copending U.S. Appl. No. 18/283,156.
International Preliminary Report on Patentability for international application PCT/EP2022/056426, filed Mar. 14, 2022, corresponding to copending U.S. Appl. No. 18/283,156.
European Search Report and Search Opinion for EP 21164243 filed Mar. 23, 2021, corresponding to PCT/EP2022/056426; with partial English language machine translation of the Search Opinion.
Rausch, et al., "Morphology and Utilization of Smooth Hydrogen-Evolving Raney Nickel Cathode Coatings and Porous Sintered-Nickel Cathodes," *J. Electrochem. Soc.* 143(9):2852-2862 (Sep. 1996).
U.S. Appl. No. 18/283,156, filed Sep. 20, 2023, Roos.

\* cited by examiner

METAL FOAM ELEMENT CONTAINING COBALT AND METHOD FOR PRODUCING SAME

CROSS REFERENCE TO RELATED APPLICATIONS

The present application is US national stage of international application PCT/EP2020/076854, which had an international filing date of Sep. 25, 2020 and which was published on Apr. 1, 2021. The PCT application claims priority to EP 19199651.1, filed on Sep. 25, 2019. The content of these prior filings is hereby incorporated by reference in its entirety.

BACKGROUND

The present invention relates to processes for producing supported catalysts, comprising the following steps: coating of metal foam bodies made of metallic cobalt, an alloy of nickel and cobalt, or an arrangement of overlying layers of nickel and cobalt with aluminum, followed by thermal treatment to achieve alloy formation between metal foam and aluminum, subsequent oxidative treatment of the aluminum surface, and application of a catalytically active layer comprising at least one support oxide and at least one catalytically active component. The present invention also relates to the supported catalysts obtainable by the process and to the use thereof in chemical transformations.

PRIOR ART

The use of metal foams as support bodies for catalytically active coatings is known from the prior art. The catalytically active coatings on the metallic support bodies are typically composed of a support oxide that increases the microscopic surface area and catalytically active metals applied to the support oxide (cf. e.g. WO 9511752 A1). The monolithic supported catalysts thus obtained can be used in a wide variety of applications, but their usability is limited by the extremely poor adhesion of the catalytically active coating, which is mainly composed of oxidic components, to the metallic support body. In the event of mechanical stress and potentially also when the supported catalyst is operated in flow-through reactors, the poor adhesion leads to detachment of fragments of the catalytically active layer, with a corresponding reduction in catalyst service life and potential disruption of plant operation by detached solid particles.

An alternative is to use sol-gel processes for coating metal foams as catalyst support bodies. However, these processes require special equipment and the use of costly reagents that have a high hazard potential and are difficult to handle.

Another process known from the prior art for producing metal foam supported catalysts makes use of the ability to produce relatively stable oxide layers on metal surfaces by atomic layer deposition (ALD). For example, US 20120329889 A1 discloses a method for producing metal foam supported catalysts for the Fischer-Tropsch synthesis in which a thin $Al_2O_3$ film is produced by atomic layer deposition (ALD) on a metal foam, followed by application of an oxidic coating by dip coating, drying, and subsequent calcination. US 20120329889 A1 mentions explicitly the difficulty in achieving a stable coupling between the metal foam surface and the oxidic coating (cf. paragraphs [0068] and [0069]) and that this is achieved by applying the oxidic intermediate layer by ALD. The process disclosed in US 20120329889 A1 does however require extremely complex apparatus.

In view of the poor access to stable metal foam supported catalysts, the object of the present invention was to provide a process that is as simple as possible and suitable for producing large quantities in order to produce from a catalytically inert metal foam body a supported catalyst having a catalytic coating. In such a catalyst, the pores provided by the foam base structure should not clog and the catalytic coating should be as simple as possible to apply but nevertheless be characterized by very good adhesion to the metal foam body. The processes of the present invention and the products obtainable by these processes meet this need.

The Present Invention

Processes according to the invention for producing supported catalysts comprise the following steps:
(a) providing a metal foam body A made of metallic cobalt, an alloy of nickel and cobalt, or an arrangement of overlying layers of nickel and cobalt,
(b) applying an aluminum-containing powder MP to metal foam body A so as to obtain metal foam body AX,
(c) treating metal foam body AX thermally to achieve alloy formation between metal foam body A and aluminum-containing powder MP so as to obtain metal foam body B,
  wherein the maximum temperature in the thermal treatment of metal foam body AX is within a range from 680 to 715° C.,
  and wherein the total duration of thermal treatment in a temperature range from 680 to 715° C. is between 5 and 240 seconds,
(d) oxidatively treating metal foam body B so as to obtain metal foam body C,
(e) applying a catalytically active layer comprising at least one support oxide and at least one catalytically active component to at least part of the surface of metal foam body C so as to obtain a supported catalyst.

Nickel foam bodies on which aluminum is first applied, alloyed and is then partially leached out again are known from the prior art as an alternative to classic Raney-type catalysts (cf. e.g. EP 2764916 A1). The foam bodies thus obtained are activated all-metal catalysts of the Raney type that are typically used in hydrogenation reactions.

Also known from the prior art are metal foam bodies on which aluminum is first applied and alloyed and which are then oxidized (cf. Wen-Wen Zeng et al. "Synthesis and compression property of oxidation-resistant Ni—Al foams", Acta metallurgica Sinica, volume 30, No. 10, 1 Oct. 2017, pages 965-972). However, in the process of Wen-Wen Zeng et al. the entire cross section of the metal foam originally present is alloyed with aluminum (cf. page 972, Conclusion), whereas in the process of the present invention alloy formation is limited to the upper layers of the metal foam, so that unalloyed areas remain in central regions of the metal foam.

Experimental results obtained in association with the present invention show that the choice of temperature conditions for the thermal treatment for alloy formation has a considerable influence on the result. The processes according to the invention allow alloy formation to be limited to the upper layers of the metal foam, so that unalloyed regions remain in central regions of the metal foam. The presence of these unalloyed areas influences inter alia the mechanical stability of the supported catalyst obtained. The breaking/ compressive strength decreases significantly with increasing degree of alloying, complete alloying of the metal foam resulting in very brittle supported catalysts that tend to break under mechanical stress. This fact is of considerable practical importance, because continuously operated fixed-bed reactors used on an industrial scale can have fixed-bed volumes of up to 100 m$^3$, which means that, depending on the bulk density and height of the fixed bed used, there may potentially be multiple metric tons weighing down on its lower layers. If the supported catalyst used to form the fixed bed does not have sufficient mechanical stability and durability to bear such weights over several thousand hours of operation, this can lead to breakage of the support structures and thus to mechanical breakdown of the catalytically active regions (catalyst breakage). Broken material may be discharged with the fluid from the reactor into adjoining plant components and/or result in caking in the fixed bed. In both cases, significant disruptions to plant operation are the result.

In connection with the present invention, a metal foam body A is understood to mean a metal body in foam form. Metal bodies in foam form are described e.g. in Ullmann's Encyclopedia of Industrial Chemistry, section "Metallic Foams", published online on Jul. 15, 2012, DOI: 10.1002/14356007.c16_c01.pub2. Metal foams having different morphological properties—pore size and shape, layer thickness, area density, geometric surface area, porosity, etc. —are in principle suitable. Metal foam A preferably has a density within a range from 400 to 1500 g/m$^2$, a pore size of 400 to 3000 µm, preferably of 400 to 800 µm, and a thickness within a range from 0.5 to 10 mm, preferably from 1.0 to 5.0 mm. Production can be carried out in a manner known per se. For example, a foam made of an organic polymer may be coated initially with a metal and then the polymer removed by thermolysis, yielding a metal foam. For coating with at least one first metal or a precursor thereof, the foam made of the organic polymer may be contacted with a solution or suspension containing the first metal. This may be done for example by spraying or dipping. Deposition by means of chemical vapor deposition (CVD) is also possible. A polymer foam suitable for producing shaped bodies in the form of a foam preferably has a pore size within a range from 100 to 5000 µm, more preferably from 450 to 4000 µm, and in particular from 450 to 3000 µm. A suitable polymer foam preferably has a layer thickness from 0.5 to 10 mm, more preferably from 1.0 to 5.0 mm. A suitable polymer foam preferably has a density of 300 to 1200 kg/m$^3$. The specific surface area is preferably within a range from 100 to 20 000 m$^2$/m$^3$, more preferably 1000 to 6000 m$^2$/m$^3$. The porosity is preferably within a range from 0.50 to 0.95.

The metal foam bodies A used in step (a) of the process according to the invention may have any desired shape, for example cubic, cuboidal, cylindrical etc. The metal foam bodies may alternatively be formed e.g. as monoliths.

The aluminum-containing powder MP may be applied in various ways in step (b) of the process according to the invention, for example by contacting metal foam body A with a composition of aluminum-containing powder MP by rolling or dipping, or by applying a composition of aluminum-containing powder MP by spraying, scattering or pouring. The composition of aluminum-containing powder MP for this purpose may be in the form of a suspension or in the form of a powder.

The actual applying of the composition of aluminum-containing powder MP to metal foam body A in step (b) of the process according to the invention is preferably preceded by prior impregnation of the metal foam body A with a binder. The impregnation can be accomplished, for example, by spraying the binder or dipping metal foam body A into the binder, but is not limited to these options. It is then possible to apply the composition of the metal-containing powder MP to the metal foam body A thus prepared.

Alternatively, it is possible to apply binder and composition of aluminum-containing powder MP in one step. For this, either the composition of aluminum-containing powder MP is suspended in the liquid binder itself prior to application or the composition of aluminum-containing powder MP and the binder are suspended in an auxiliary fluid F.

The binder is a composition that can be completely converted into gaseous products by thermal treatment within a temperature range from 100 to 400° C., comprising an organic compound that promotes adhesion of the composition of aluminum-containing powder MP on the metal foam body. The organic compound is preferably selected from the following group: polyethyleneimine (PEI), polyvinylpyrrolidone (PVP), ethylene glycol, mixtures of these compounds. Particular preference is given to PEI. The molecular weight of the polyethyleneimine is preferably within a range from 10 000 to 1 300 000 g/mol. The molecular weight of the polyethyleneimine (PEI) is preferably within a range from 700 000 to 800 000 g/mol.

Auxiliary fluid F must be able to form a suspension of the composition of aluminum-containing powder MP and the binder and be completely converted into gaseous products by thermal treatment within a temperature range from 100 to 400° C. Auxiliary fluid F is preferably selected from the following group: water, ethylene glycol, PVP, and mixtures of these compounds. When auxiliary fluid is used, the binder is typically suspended in water in a concentration within a range from 1% to 10% by weight, followed by suspension of the composition of aluminum-containing powder MP in this suspension.

The aluminum-containing powder MP used in step (b) of the process according to the invention comprises pulverulent aluminum, but may also contain additions that help increase flowability or water stability. Such additions must be completely converted into gaseous products by thermal treatment within a temperature range from 100 to 400° C.

The aluminum-containing powder MP preferably has an aluminum content within a range from 80% to 99.8% by weight. Preference is given to powders in which the aluminum particles have a particle size of not less than 5 µm and not greater than 200 µm. Particular preference is given to powders in which 95% of the aluminum particles have a particle size of not less than 5 µm and not greater than 75 µm. It may be the case that the aluminum-containing powder MP, besides the aluminum component in elemental form, also contains an aluminum component in oxidized form. This oxidized fraction is typically in the form of oxidic compounds, for example oxides, hydroxides and/or carbonates. The proportion by mass of oxidized aluminum is typically within a range from 0.05% to 10% by weight of the total mass of the aluminum-containing powder MP.

In step (c) of the process according to the invention, a thermal treatment is carried out in order to achieve the formation of one or more alloys.

Experimental results obtained in association with the present invention show that the choice of temperature conditions for the thermal treatment for alloy formation has a considerable influence on the course of alloy formation. The processes according to the invention allow alloy formation to be limited to the upper layers of the metal foam, so that unalloyed regions remain in central regions of the metal foam.

In step (c) of the process according to the invention, metal foam body AX is treated thermally to achieve alloy formation between metal foam body A and aluminum-containing powder MP so as to obtain metal foam body B, the maximum temperature in the thermal treatment of metal foam body AX being within a range from 680 to 715° C. and the total duration of thermal treatment in a temperature range from 680 to 715° C. being between 5 and 240 seconds.

The thermal treatment comprises the typically gradual heating of the metal foam body AX and subsequent cooling to room temperature. The thermal treatment takes place under inert gas or under reducing conditions. Reducing conditions are understood to mean the presence of a gas mixture comprising hydrogen and at least one gas that is inert under the reaction conditions. A suitable example is a gas mixture comprising 50% by volume of $N_2$ and 50% by volume of H2. The inert gas used is preferably nitrogen. The heating can be accomplished for example in a belt furnace. Suitable heating rates are within a range from 10 to 200 K/min, preferably 20 to 180 K/min. During the thermal treatment, the temperature is typically first increased from room temperature to about 300 to 400° C., moisture and organic constituents being removed from the coating at this temperature for a period of about 2 to 30 minutes. The temperature is then increased to within a range from 680 to 715° C., resulting in alloy formation between metal foam body A and the aluminum-containing powder MP. The metal foam body is then quenched by contact with the inert gas environment at a temperature of approx. 200° C.

In order, for the metals involved in accordance with the invention, to limit alloy formation to the upper regions of the metal foam and to leave unalloyed regions within the metal foam, it is necessary that the maximum temperature in the thermal treatment of metal foam body AX in step (c) is within a range from 680 to 715° C., and also that the total duration of thermal treatment in a temperature range from 680 to 715° C. is between 5 and 240 seconds. The duration of thermal treatment can to a certain degree compensate for the level of the maximum treatment temperature and vice versa, but it is found that the frequency of experiments achieving alloy formation in the upper region of the metal foam while at the same time leaving unalloyed regions within the metal foam decreases sharply when the maximum temperature in the thermal treatment is outside the 680 to 715° C. temperature range and/or the duration of thermal treatment in a temperature range between 680 and 715° C. is outside the range of 5 to 240 seconds. If the maximum temperature is too high and/or the metal foam body remains in the region of the maximum temperature for too long, this can cause alloy formation to advance into the lowest depths of the metal foam so that no unalloyed regions remain. If the maximum temperature is too low and/or the metal foam body does not remain in the region of the maximum temperature for long enough, alloy formation does not commence at all.

The thermal treatment of the metal foam in step (c) of the process according to the invention leads to the formation of aluminum-containing phases. The ratio V of the masses of metal foam body B to metal foam body A, V=m(metal foam body B)/m(metal foam body A), is a measure of how much aluminum was alloyed into the foam in step (c) of the process according to the invention. In a preferred embodiment, the ratio V of the masses of metal foam body B to metal foam body A, V=m(metal foam body B)/m(metal foam body A), is within a range from 1.1:1 to 1.5:1. In a further preferred embodiment, the ratio V of the masses of metal foam body B to metal foam body A, V=m(metal foam body B)/m(metal foam body A), is within a range from 1.2:1 to 1.4:1.

In step (d) of the process according to the invention, an oxidative treatment of metal foam body B is carried out so as to obtain metal foam body C.

The aim of the oxidative treatment of metal foam body B in step (d) of the process according to the invention is to furnish the aluminum present on the surface of metal foam body B with an external aluminum oxide layer. This aim can for example be achieved either by exposing metal foam body B in a heated state to an oxidizing gas atmosphere (e.g. air) or through the initial superficial formation of aluminum hydroxide on metal foam body B, e.g. by contacting with an alkali solution, and then converting the aluminum hydroxide into aluminum oxide by thermal treatment under oxidizing conditions.

In order to expose metal foam body B in a heated state to an oxidizing gas atmosphere, it is sufficient e.g. to heat the metal foam body to a suitable temperature in a furnace with the admission of air.

If metal foam body B is heated with the admission of air without prior formation of aluminum hydroxide, the chosen temperature should be between 200° C. and 1200° C., or between 200° C. and 1000° C., or between 200° C. and 750° C. It is in accordance with the invention preferable that the thermal oxidation is carried out for a period of 1 to 60 minutes at a temperature of 200° C. to 700° C. in air.

If aluminum hydroxide is first superficially formed on metal foam body B, e.g. by contacting with an alkali solution and only then carrying out thermal treatment, at least some of the aluminum present on the surface will initially be converted into aluminum hydroxide and at least some of the aluminum hydroxide formed on the surface will subsequently be converted into aluminum oxide.

The conversion of at least part of the aluminum superficially present into aluminum hydroxide is preferably achieved by contacting the metal foam body with an aqueous alkali solution.

The aqueous alkali solution particularly preferably contains sodium hydroxide, potassium hydroxide, lithium hydroxide or a combination thereof in a concentration from 0.05% to 30% by weight, preferably 0.5% to 5% by weight, and metal foam body B is contacted with the aqueous alkali solution for a period of 5 to 120 minutes, preferably not more than 30 minutes, and more preferably not more than 10 minutes. This treatment may take place within a temperature range between 10° C. and 110° C. Preference is given to treatment at 20° C. (room temperature).

This is followed by thermal conversion in an oxidizing atmosphere of at least part of the superficially formed aluminum hydroxide into aluminum oxide. This is done by heating to a temperature of 20° C. (room temperature) to 700° C. for a period of 1 minute to 8 hours with the admission of air. It is in accordance with the invention preferable that the thermal oxidation is carried out for a period of 1 to 60 minutes at a temperature of 200° C. to 700° C. in air.

Metal foam body C serves as a support body for a suitable catalyst, which can be specifically selected for the particular reaction that is to be catalyzed.

In step (e) of the process according to the invention, a catalytically active layer comprising at least one support oxide and at least one catalytically active component is applied to at least part of the surface of metal body C so as to obtain a supported catalyst.

Metal foam bodies C according to the invention can be provided particularly readily with a catalytically active layer according to the invention, since the aluminum oxide skin produced on the surface of metal foam body C ensures extremely good binding of the support oxides and affords long durability and service life as well as extremely high mechanical stability, in particular abrasion resistance.

The catalytically active layer, comprising at least one support oxide and at least one catalytically active component, can be applied to metal foam body C e.g. by sucking or pumping a coating suspension through the continuous cavities of the open-pore metal foam body C. This is possible because, in its continuous cavities and high dimensional stability, metal foam body C is similar to the monolithic substrates used in car exhaust catalysis. It is also possible to apply a coating suspension by dipping (called "dip coating") or by spraying (called "spray coating"). Which of the application processes known in principle in the prior art is preferable depends firstly on the composition and flow properties of the coating suspension, and secondly on the actual structure of the metal foam body according to the invention. Dip coating has the greatest possible tolerance to varying properties of the coating suspension and is therefore suitable for the coating of all metal foam bodies of the invention.

According to the present invention, after contacting with the coating suspension the coated metal foam body is in step (e) calcined so as to obtain the supported catalyst.

The catalytically active layer according to the invention comprises at least one support oxide. Support oxides are for the purposes of the present invention inorganic oxides having high specific surface areas typically between 50 and 200 $m^2/g$. These support oxides have multiple functions in the finished catalyst: firstly they serve to increase at the microscopic level the macroscopic, i.e. geometric, surface area provided by the metal foam bodies of the invention, which is referred to in the context of this invention as the contact area of the catalyst with the reaction medium. Secondly, they can themselves interact with the catalytically active species and thus influence the course of the reaction. For example, the choice of support oxide influences the selectivity of complex hydrogenation reactions in which multiple functional groups of organic substrate molecules can react with hydrogen. In addition, they provide the microscopic surface on which the catalytically active components are dispersed. They also form a matrix in which further functional components and additives may be dispersed, which serves for adjustment of specific catalyst functions when tailoring the catalyst to a specific application.

Support oxides are preferably selected from the group consisting of aluminum oxide, silicon dioxide, titanium oxide, and mixtures thereof.

Used as catalytically active components of the catalytically active layer are transition metals or transition metal compounds, the transition metals preferably being selected from the group consisting of iron, ruthenium, osmium, cobalt, rhodium, iridium, nickel, palladium, platinum, cerium, copper, silver, gold, and mixtures thereof.

As further functional components and additives, the catalytic active layer may include inorganic oxides, preferably selected from the oxides of the alkaline earth metals, the oxides of the transition metals, of the rare earths, the oxides of aluminum and gallium, the oxides of silicon, germanium, and tin, and/or mixtures thereof.

The catalytically active layers according to the present invention may comprise one or more support oxides, one or more catalytically active components and optionally further functional components and additives.

In order to apply the catalyst to the metal foam bodies of the invention, a coating suspension is produced by introducing the constituents into water. The catalytic components are here applied to the support oxides either by prior impregnation of the support oxides with appropriate metal salt solutions (precursor solutions) or by addition of precursor solutions directly to the coating suspension and optional precipitation or chemically induced deposition or decomposition of the precursor compound on the already suspended support oxide(s). Functional components and additives can also be introduced in this way or added directly as oxidic solids. Alternatively, it is possible to add all constituents of the catalyst that result from soluble precursors by reimpregnation methods after the support oxides have been applied to the metal foam bodies of the invention. The choice of preparation method is determined by the target composition and by the properties of the resulting catalyst that are to be established.

The fixing of the catalytically active layer applied to the metal foam bodies in step (e) of the process according to the invention is preferably accomplished by calcination in air. In accordance with the invention, this calcination is carried out for a period of 1 minute to 8 hours at a temperature of 200° C. to 800° C. in air. It is in accordance with the invention preferable that the calcination is carried out for a period of 1 to 480 minutes at a temperature of 200° C. to 680° C. in air. Particularly preferably, the calcination is carried out for a period of 1 to 480 minutes at a temperature of 300° C. to 650° C. in air.

It is in accordance with the invention preferable that the thermal oxidation in step d) is carried out for a period of 1 to 60 minutes at a temperature of 200° C. to 680° C. in air and the calcination in step e) for a period of 1 to 480 minutes at a temperature of 200° C. to 680° C. in air.

The process according to the invention for producing supported catalysts is much less costly than existing processes. In addition, a metal foam body of the invention forms, by virtue of its excess of Al at the surface, a pure aluminum oxide layer that represents a barrier to diffusion between the support material and catalytic layer.

Catalytic layers based on aluminum oxide as support oxide and aluminum oxide at the surface of the metal foam body are systems of the same type. Therefore, coefficients of expansion are similar, flaking under thermal stress is low, and compound stability as a result of a calcining operation is very good.

In addition to the processes according to the invention for producing supported catalysts, the present invention also provides supported catalysts that are themselves obtainable by these processes and the use of said catalysts in chemical transformations.

Supported catalysts according to the invention can for example be used advantageously in chemical fixed-bed processes.

Example for Co Foam

1. Providing of Metal Foam Bodies

Six metal foam bodies (a-f) made of cobalt were provided (manufacturer: AATM, dimensions: 100 mm×100 mm×2 mm, weight per unit area: 1000 $g/m^2$, average pore diameter 580 μm), which had been produced by electrolytic deposition of cobalt on a polyurethane foam and subsequent thermolysis of the plastic components.

2. Application of Aluminum

Binder solution (polyethyleneimine 2.5% by weight in water) was then first sprayed onto metal foam bodies a, b, c, d, e, and f, followed by application of pulverulent aluminum (manufacturer: AMG, average particle size: <63 µm, containing 3% by weight of added ethylenebis(stearamide)) in the form of a dry powder (approx. 400 g/m$^2$).

3. Thermal Treatment

Metal foam bodies a, b, c, d, and e were then subjected to a thermal treatment in a furnace under a nitrogen atmosphere. First of all, the furnace was heated over a period of approx. 15 min from room temperature to the maximum temperature, which was maintained for a defined time, followed by quenching by contacting with a nitrogen atmosphere at 200° C.

Maximum temperature for metal foam bodies a, d, e:
700° C. for 2 minutes
Temperature course for metal foam body b:
600° C. for 2 minutes
Temperature course for metal foam body c:
750° C. for 2 minutes 4. Determination of Extent of Alloying The extent of alloy formation in the metal foam bodies was then determined. This was done by examining cross sections of the metal foam bodies under a microscope and scanning electron microscope. Whereas in metal foam bodies a, d, and e superficial alloy formation had taken place, but with unalloyed regions remaining within the metal foam, in the case of metal foam body b no alloy formation took place and in metal foam body c alloy formation was so far advanced that no unalloyed regions remained in the interior of the metal foam.

5. Oxidative Treatment

Oxidative treatment of metal foam bodies a and d was then carried out.

Metal foam body a was exposed to an oxidizing gas atmosphere while in a heated state. This was done by heating the metal foam body to 700° C. in a furnace with the admission of air.

Metal foam body d was first contacted with an alkali solution (5% by weight aqueous NaOH for 10 min at 20° C.). A white precipitate forms on the foam. The precipitate is the conversion of aluminum into aluminum hydroxide. Metal foam body d was then dried in air. The dried metal foam body with the white precipitate is preoxidized in a preheated furnace at 700° C. and normal atmosphere, in which the aluminum hydroxide is converted into aluminum oxide.

The oxidic pretreatment has a number of functions:
protection of the support material against further oxidation
adhesion promoter between metallic and ceramic system
diffusion barrier for alloy elements on the support material into the catalytic ceramic layer 6. Comparative Treatment Metal foam body f, which had previously remained untreated, was furnished with an aluminum oxide layer, as described in the prior art (cf. WO95/11752A1, example 3). This was done by completely immersing metal foam body f in a saturated sodium aluminate solution for 3 hours, then tilting back and forth in deionized water until the hydrolysis reaction had subsided, and finally heating at 500° C. for 3 hours with the admission of air.

7. Application of the Catalytically Active Layer

A catalytically active layer was then applied to metal foam bodies a, d, e, and f by spraying. This was done by wetting the metal foam body with water. A 2.5% polyethyleneimine suspension was then stirred with high-surface-area χ-aluminum oxide. The mixture of water/polyethyleneimine and aluminum oxide was sprayed on. Spraying was followed by a drying process at 140° C. for 30 min in air in a drying oven. For calcination, the sample was baked at 650° C. in a furnace for 5 h. The process of coating, drying, and calcination was repeated multiple times until the desired amount of coating had been applied.

8. Investigation of the Supported Catalyst Obtained

Finally, the supported catalysts obtained were investigated, including inter alia investigation of the resistance of the catalytically active layer on the metal foam bodies to mechanical stress. In many cases a scratch test can be carried out to determine the quality of the attachment of the oxidic, catalytically active layer to the support foam. However, in the present case this test is not possible because of the irregular structure of the foam. The mechanical stability of the catalytically active layer was accordingly investigated by means of a temperature change test, which provides a measure of the quality of the attachment of the oxidic layer to the support foam. This was done by heating metal foam bodies a, d, e, and f to 500° C. and then quenching in cold water. The amount lost, i.e. the mass of the catalytic layer that had flaked off each sample, was then determined by filtering off, drying, and weighing the material that had flaked off.

This gave the following result:
Metal foam bodies a and d: 3 mg loss
Metal foam body f: 10 mg loss
Metal foam body e: 50 mg loss Whereas the catalytically active layer on metal foam bodies a and d had a high resistance to mechanical stress, the resistance of the catalytically active layer on metal foam body f was markedly lower and on metal foam body e it was very low.

Example for NiCo Foam

2. Providing of Metal Foam Bodies

Six metal foam bodies (a-f) made of nickel-cobalt were provided (manufacturer: AATM, dimensions: 100 mm×100 mm×2 mm, weight per unit area: 1000 g/m$^2$, average pore diameter 580 µm), which had been produced by electrolytic deposition of nickel on a polyurethane foam, in addition to which cobalt had been deposited on the nickel, and subsequent thermolysis of the plastic components.

2. Application of Aluminum

Binder solution (polyethyleneimine 2.5% by weight in water) was then first sprayed onto metal foam bodies a, b, c, d, e, and f, followed by application of pulverulent aluminum (manufacturer: AMG, average particle size: <63 µm, containing 3% by weight of added ethylenebis(stearamide)) in the form of a dry powder (approx. 400 g/m$^2$).

3. Thermal Treatment

Metal foam bodies a, b, c, d, and e were then subjected to a thermal treatment in a furnace under a nitrogen atmosphere. First of all, the furnace was heated over a period of approx. 15 min from room temperature to the maximum temperature, which was maintained for a defined time, followed by quenching by contacting with a nitrogen atmosphere at 200° C.

Maximum temperature for metal foam bodies a, d, e:
700° C. for 2 minutes
Temperature course for metal foam body b:
600° C. for 2 minutes
Temperature course for metal foam body c:
750° C. for 2 minutes 4. Determination of Extent of Alloying The extent of alloy formation in the metal foam bodies was then determined. This was done by examining cross sections of the metal foam bodies under a microscope and scanning electron microscope. Whereas in metal foam bodies a, d, and e superficial alloy formation had taken place, but with unalloyed regions remaining within the metal foam, in the case of metal foam body b no alloy formation took place and in metal foam body c alloy formation was so far advanced that no unalloyed regions remained in the interior of the metal foam.

5. Oxidative Treatment

Oxidative treatment of metal foam bodies a and d was then carried out.

Metal foam body a was exposed to an oxidizing gas atmosphere while in a heated state. This was done by heating the metal foam body to 700° C. in a furnace with the admission of air.

Metal foam body d was first contacted with an alkali solution (5% by weight aqueous NaOH for 10 min at 20° C.). A white precipitate forms on the foam. The precipitate is the conversion of aluminum into aluminum hydroxide. Metal foam body d was then dried in air. The dried metal foam body with the white precipitate is preoxidized in a preheated furnace at 700° C. and normal atmosphere, in which the aluminum hydroxide is converted into aluminum oxide.

The oxidic pretreatment has a number of functions:
protection of the support material against further oxidation
adhesion promoter between metallic and ceramic system
diffusion barrier for alloy elements on the support material into the catalytic ceramic layer 6. Comparative Treatment Metal foam body f, which had previously remained untreated, was furnished with an aluminum oxide layer, as described in the prior art (cf. WO95/11752A1, example 3). This was done by completely immersing metal foam body f in a saturated sodium aluminate solution for 3 hours, then tilting back and forth in deionized water until the hydrolysis reaction had subsided, and finally heating at 500° C. for 3 hours with the admission of air.

7. Application of the Catalytically Active Layer

A catalytically active layer was then applied to metal foam bodies a, d, e, and f by spraying. This was done by wetting the metal foam body with water. A 2.5% polyethyleneimine suspension was then stirred with high-surface-area χ-aluminum oxide. The mixture of water/polyethyleneimine and aluminum oxide was sprayed on. Spraying was followed by a drying process at 140° C. for 30 min in air in a drying oven. For calcination, the sample was baked at 650° C. in a furnace for 5 h. The process of coating, drying, and calcination was repeated multiple times until the desired amount of coating had been applied.

8. Investigation of the Supported Catalyst Obtained

Finally, the supported catalysts obtained were investigated, including inter alia investigation of the resistance of the catalytically active layer on the metal foam bodies to mechanical stress. In many cases a scratch test can be carried out to determine the quality of the attachment of the oxidic, catalytically active layer to the support foam. However, in the present case this test is not possible because of the irregular structure of the foam. The mechanical stability of the catalytically active layer was accordingly investigated by means of a temperature change test, which provides a measure of the quality of the attachment of the oxidic layer to the support foam. This was done by heating metal foam bodies a, d, e, and f to 500° C. and then quenching in cold water. The amount lost, i.e. the mass of the catalytic layer that had flaked off each sample, was then determined by filtering off, drying, and weighing the material that had flaked off.

This gave the following result:
Metal foam bodies a and d: 4 mg loss
Metal foam body f: 12 mg loss
Metal foam body e: 48 mg loss Whereas the catalytically active layer on metal foam bodies a and d had a high resistance to mechanical stress, the resistance of the catalytically active layer on metal foam body f was markedly lower and on metal foam body e it was very low.

The invention claimed is:

1. A process for producing a supported catalyst, comprising the following steps:
(a) providing a metal foam body A made of metallic cobalt, an alloy of nickel and cobalt, or overlying layers of nickel and cobalt;
(b) applying an aluminum-containing powder MP to metal foam body A so as to obtain metal foam body AX;
(c) thermally treating the metal foam body AX to achieve alloy formation between metal foam body A and aluminum-containing powder MP so as to obtain metal foam body B;
wherein the maximum temperature in the thermal treatment of metal foam body AX is within a range from 680 to 715° C. for a total duration of between 5 and 240 seconds;
(d) oxidizing metal foam body B so as to obtain metal foam body C;
(e) applying a catalytically active layer comprising at least one support oxide and at least one catalytically active component to at least part of the surface of metal foam body C so as to obtain the supported catalyst;
wherein the oxidative treatment of metal foam body B in step (d) is selected from the following:
heating of metal foam body B while in contact with an oxidizing gas atmosphere without prior formation of aluminum hydroxide on the surface of the metal foam body; or
heating of metal foam body B while in contact with an oxidizing gas atmosphere after aluminum hydroxide has previously been formed on the surface of the metal foam body.

2. The process of claim 1, wherein, for the oxidative treatment of metal foam body B in step (d), metal foam body B is heated while in contact with an oxidizing gas atmosphere without prior formation of aluminum hydroxide on the surface of the metal foam body.

3. The process of claim 2, wherein the heating while in contact with an oxidizing gas atmosphere is carried out for a period of 1 to 60 minutes at a temperature of 200° C. to 700° C. in air.

4. The process of claim 1, wherein, for the oxidative treatment of metal foam body B in step (d), metal foam body B is heated while in contact with an oxidizing gas atmosphere after aluminum hydroxide has been formed on the surface of the metal foam body.

5. The process of claim 4, wherein aluminum hydroxide is formed on the surface by contacting the metal foam body with an aqueous alkali solution.

6. The process of claim 5, wherein the aqueous alkali solution contains sodium hydroxide, potassium hydroxide, lithium hydroxide or combinations thereof, and the metal foam body is contacted with the aqueous alkali solution for a period of not more than 30 minutes.

7. The process of claim 4, wherein the heating while in contact with an oxidizing gas atmosphere is carried out for a period of 1 to 60 minutes at a temperature of 200° C. to 700° C. in air.

8. The process of claim 1, wherein the support oxide of the catalytically active layer applied in step (e) is selected from the group consisting of: aluminum oxide, silicon dioxide, titanium oxide, and mixtures thereof.

9. The process of claim 1, wherein the catalytically active component is a transition metal or transition metal compound, and the transition metal being is selected from the group consisting of: iron, ruthenium, osmium, cobalt, rhodium, iridium, nickel, palladium, platinum, cerium, copper, silver, gold, and mixtures thereof.

10. The process of claim 9, wherein, for the oxidative treatment of metal foam body B in step (d), metal foam body B is heated while in contact with an oxidizing gas atmosphere without prior formation of aluminum hydroxide on the surface of the metal foam body.

11. The process of claim 10, wherein the heating while in contact with an oxidizing gas atmosphere is carried out for a period of 1 to 60 minutes at a temperature of 200° C. to 700° C. in air.

12. The process of claim 9, wherein, for the oxidative treatment of metal foam body B in step (d), metal foam body B is heated while in contact with an oxidizing gas atmosphere after aluminum hydroxide has been formed on the surface of the metal foam body.

13. The process of claim 12, wherein aluminum hydroxide is formed on the surface by contacting the metal foam body with an aqueous alkali solution.

14. The process of claim 13, wherein the aqueous alkali solution contains sodium hydroxide, potassium hydroxide, lithium hydroxide or combinations thereof, and the metal foam body is contacted with the aqueous alkali solution for a period of not more than 30 minutes.

15. The process of claim 14, wherein the heating while in contact with an oxidizing gas atmosphere is carried out for a period of 1 to 60 minutes at a temperature of 200° C. to 700° C. in air.

16. The process of claim 15, wherein the support oxide of the catalytically active layer applied in step (e) is selected from the group consisting of: aluminum oxide, silicon dioxide, titanium oxide, and mixtures thereof.

* * * * *